(12) United States Patent
Curran (10) Patent No.: US 7,127,877 B2
(45) Date of Patent: Oct. 31, 2006

(54) UNIVERSAL MOWER BLADE

(75) Inventor: Alan Curran, Lawrenceburg, TN (US)

(73) Assignee: Briggs & Stratton Corporation, Wauwatosa, WI (US)

(*) Notice: Subject to any disclaimer, the term of this patent is extended or adjusted under 35 U.S.C. 154(b) by 0 days.

(21) Appl. No.: 11/043,413

(22) Filed: Jan. 27, 2005

(65) Prior Publication Data

US 2005/0229573 A1 Oct. 20, 2005

Related U.S. Application Data (60) Provisional application No. 60/540,066, filed on Jan. 30, 2004.

(51) Int. Cl.
*A01D 34/52* (2006.01)
*A01D 34/73* (2006.01)

(52) U.S. Cl. .............. 56/255; 56/295; D15/17

(58) Field of Classification Search .......... D15/17; 56/295, 255, 17.5; 30/276
See application file for complete search history.

(56) References Cited

U.S. PATENT DOCUMENTS

| | | | |
|---|---|---|---|
| 2,737,003 A | | 3/1956 | Beers |
| 3,157,978 A | | 11/1964 | McMullen |
| 3,327,460 A | * | 6/1967 | Blackstone ............... 56/295 |
| 3,545,189 A | | 12/1970 | Gillaspie et al. |
| 3,564,824 A | | 2/1971 | Tygh, Jr. |
| 4,610,129 A | | 9/1986 | Bolger et al. |
| 4,696,153 A | | 9/1987 | Boains, Jr. |
| 4,712,364 A | * | 12/1987 | Oxley ..................... 56/295 |
| 4,922,698 A | * | 5/1990 | Taylor ..................... 56/295 |
| 4,936,884 A | | 6/1990 | Campbell |
| 5,094,065 A | * | 3/1992 | Azbell ..................... 56/255 |
| D357,691 S | * | 4/1995 | Bryant ..................... D15/17 |
| 5,438,819 A | | 8/1995 | Dallman |
| 5,501,068 A | * | 3/1996 | Martz ..................... 56/255 |
| 5,502,958 A | | 4/1996 | Plamper |
| 5,619,846 A | | 4/1997 | Brown |
| 5,711,141 A | | 1/1998 | Pitman et al. |
| 5,724,796 A | | 3/1998 | Plamper |
| 5,881,540 A | | 3/1999 | Miller |
| 5,946,895 A | | 9/1999 | Martens |
| 6,205,755 B1 | | 3/2001 | Bontrager et al. |

(Continued)

FOREIGN PATENT DOCUMENTS

DE 20210519 U1 * 11/2003

OTHER PUBLICATIONS

Oregon Outdoor Equipment Parts date 2003 Catalog—Replacement Blades, 2003, pp. 110-134.

(Continued)

*Primary Examiner*—Árpád Fábián Kovács
(74) *Attorney, Agent, or Firm*—Michael Best & Friedrich LLP (57) ABSTRACT

A mower blade includes a mid-section, two sharpened, end sections, and a blade longitudinal axis. The mid-section includes a circular, central hole having a relatively large diameter and being centered on the blade longitudinal axis and first and second slots centered on the blade longitudinal axis. Each of the first and second slots are positioned on opposite sides of the central hole. The mid-section also includes first and second circular, side holes positioned off the blade longitudinal axis and on opposite sides of the central hole. Each of the first and second side holes have a diameter that is smaller than the diameter of the central hole. The diameter of the central hole is larger than the width of each of the first and second slots.

20 Claims, 6 Drawing Sheets

U.S. PATENT DOCUMENTS 6,470,661 B1 10/2002 Plamper
2002/0104420 A1* 8/2002 Bascom et al. ............... 83/665
2003/0041582 A1 3/2003 Plamper
2003/0101706 A1 6/2003 Kenny

OTHER PUBLICATIONS

MTD Gator Mulching Blades, http://www.jackssmallengines.com/gatmtd.cfm Prior to date Oct. 27, 2003, Five Pages.

* cited by examiner

UNIVERSAL MOWER BLADE

This application claims the benefit of U.S. Provisional Application Ser. No. 60/540,066 filed on Jan. 30, 2004, the entire contents of which being incorporated herein by reference thereto.

FIELD

The present invention relates to mower blades for use on lawnmowers.

BACKGROUND

Known lawnmowers include a blade adaptor that is structured to secure a mower blade to the mower blade drive shaft of the lawnmower. Accordingly, mower blades are typically manufactured such that they are structured for use with a particular blade adaptor. One example of a blade adaptor and its corresponding mower blade can be found in U.S. Pat. No. 5,946,895 to Martens, which is incorporated herein in its entirety by reference thereto.

SUMMARY

One aspect of the invention relates to a mower blade including a mid-section, two sharpened, end sections on opposite sides of the mid-section, and a blade longitudinal axis extending through the mid-section and the end sections. The mid-section includes a circular, central hole having a relatively large diameter and being centered on the blade longitudinal axis and first and second slots centered on the blade longitudinal axis. Each of the first and second slots are positioned on opposite sides of the central hole. Each of the first and second slots extend along the blade longitudinal axis and have a width that is transverse to the blade longitudinal axis and that is established at a maximum extent of the width by a pair of opposite, substantially parallel sides that are substantially parallel to the blade longitudinal axis. The mid-section also includes first and second circular, side holes positioned off the blade longitudinal axis and on opposite sides of the central hole. Each of the first and second side holes and the central hole are centered on a common axis that is transverse to the blade longitudinal axis. Each of the first and second side holes have a diameter that is smaller than the diameter of the central hole. The diameter of the central hole is larger than the width of each of the first and second slots.

Another aspect of the invention relates to a mower blade assembly including an adapter attached to a lawnmower and a mower blade. The adapter has a central protrusion protruding from a bottom side of the adapter. The central protrusion has a plurality of teeth protruding from an outer circumference of the central protrusion. The mower blade is positioned on the adapter. The mower blade has a mid-section, two sharpened, end sections on opposite sides of the mid-section, and a blade longitudinal axis extending through the mid-section and the end sections. The mid-section includes a circular, central hole having a relatively large diameter and being centered on the blade longitudinal axis and first and second slots centered on the blade longitudinal axis. Each of the first and second slots are positioned on opposite sides of the central hole. Each of the first and second slots extend along the blade longitudinal axis and have a width that is transverse to the blade longitudinal axis and that is established at a maximum extent of the width by a pair of opposite, substantially, parallel sides that are substantially parallel to the blade longitudinal axis. The mid-section also includes first and second circular, side holes positioned off the blade longitudinal axis and on opposite sides of the central hole. Each of the first and second side holes and the central hole are centered on a common axis that is transverse to the blade longitudinal axis. Each of the first and second side holes have a diameter that is smaller than the diameter of the central hole. The central hole has a substantially circular circumference forming an opening extending completely through the mid-section. The diameter of the central hole is larger than the width of each of the first and second slots. The central protrusion including the plurality of teeth has an outermost diameter that is smaller than the diameter of the central hole, and the central protrusion, including the plurality of teeth are positioned completely within the central hole.

Still another aspect of the invention relates to a mower blade assembly including an adapter attached to a lawnmower and a mower blade positioned on the adapter. The adapter has a central protrusion protruding from a bottom side of the adapter. The mower blade has a mid-section, two sharpened, end sections on opposite sides of the mid-section, and a blade longitudinal axis extending through the mid-section and the end sections. The mid-section includes a circular, central hole having a relatively large diameter and being centered on the blade longitudinal axis and first and second slots centered on the blade longitudinal axis. Each of the first and second slots are positioned on opposite sides of the central hole. Each of the first and second slots extend along the blade longitudinal axis and have a width that is transverse to the blade longitudinal axis and that is established at a maximum extent of the width by a pair of opposite, substantially, parallel sides that are substantially parallel to the blade longitudinal axis. The mid-section also includes first and second circular, side holes positioned off the blade longitudinal axis and on opposite sides of the central hole. Each of the first and second side holes and the central hole are centered on a common axis that is transverse to the blade longitudinal axis. Each of the first and second side holes have a diameter that is smaller than the diameter of the central hole. The central hole has a substantially circular circumference forming an opening extending completely through the mid-section, and the diameter of the central hole is larger than the width of each of the first and second slots. The central protrusion has an outermost diameter that is smaller than the diameter of the central hole, and the central protrusion is positioned completely within the central hole.

These and other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
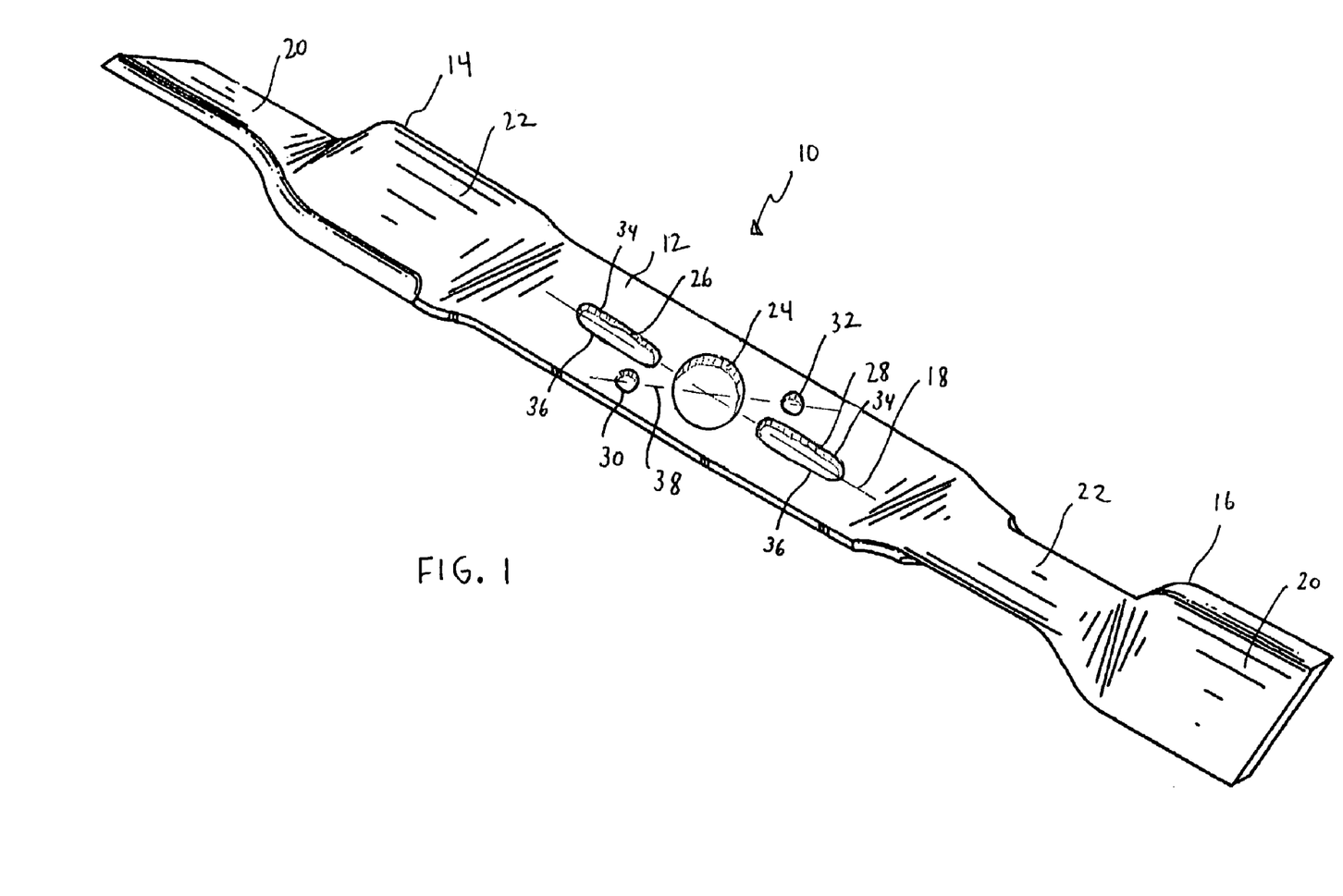
FIG. 1 is a perspective view of a mower blade constructed in accordance with an embodiment of the present invention.
Figure 2:
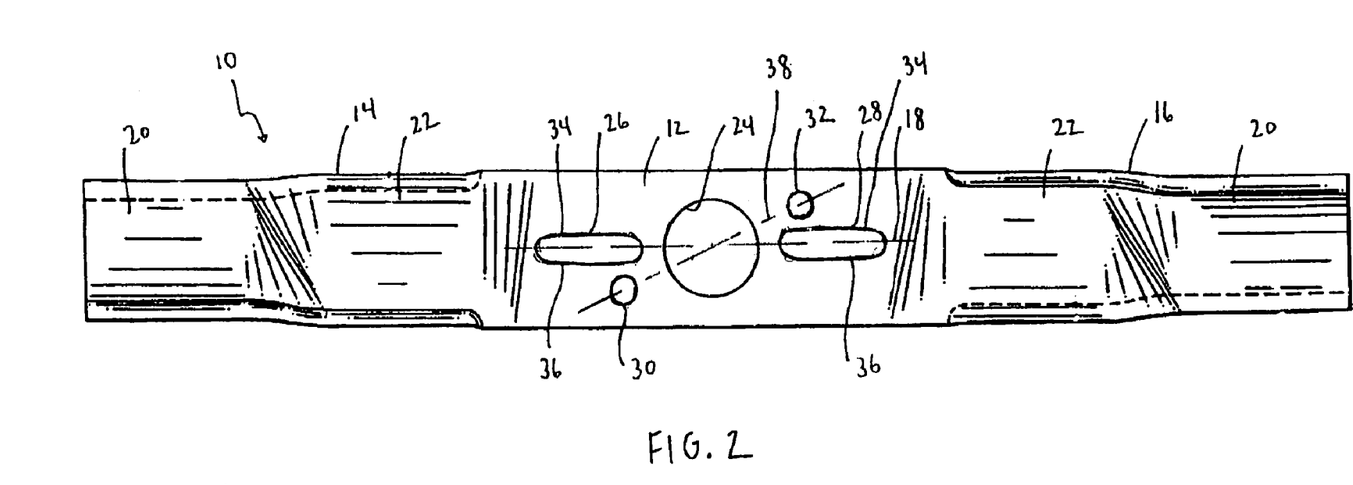
FIG. 2 is a top view of the mower blade shown in FIG. 1.
Figure 3:
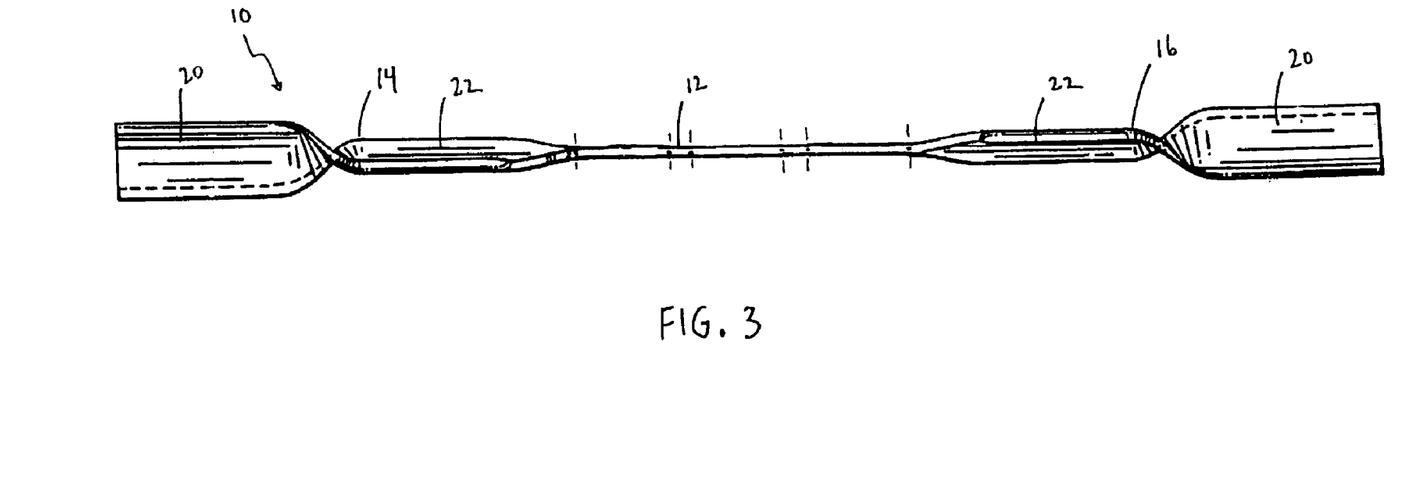
FIG. 3 is a side view of the mower blade shown in FIG. 1.

FIGS. 1–3 illustrate a lawn mower blade 10 constructed according to an embodiment of the present invention. The mower blade 10 may be constructed from a piece of flat bar stock of rectangular cross-section. The mower blade 10 includes a mid-section 12 and two sharpened, end sections 14, 16 on opposite sides of the mid-section 12. A blade longitudinal axis 18 extends through the mid-section 12 and the end sections 14, 16.

In the illustrated embodiment, the end sections 14, 16 include respective outer segments 20 and inner segments 22. The outer segments 20 of the end sections 14, 16 are twisted in opposite senses with respect to one another about the blade longitudinal axis 18. Also, the inner segments 22 of the end sections 14, 16 are twisted in opposite senses with respect to one another about the blade longitudinal axis 18. As a result, the outer and inner segment 20, 22 that form a respective end section 14, 16 of the mower blade 10 are twisted about the blade longitudinal axis 18 in opposite senses relative to one another. Edges of the outer and inner segments 20, 22 are sharpened for cutting grass, among other things.

Further details of the sharpened, end sections 14, 16 of the mower blade 10 can be found in U.S. Pat. No. 5,711,141 to Pitman et al., which is incorporated herein in its entirety by reference thereto.

A plurality of openings are formed through the mid-section 12 of the mower blade 10 for receiving a blade adaptor on the drive shaft of a rotary lawnmower and a blade mounting device. The plurality of openings are suitably sized and positioned on the mid-section 12 to provide a mower blade 10 that is universal and can be installed on a variety of differently configured blade adaptors provided on lawnmowers, as will be discussed below.

Specifically, as best shown in FIGS. 1 and 2, the mid-section 12 of the mower blade 10 includes a circular central hole 24, first and second slots 26, 28, and first and second circular side holes 30, 32. It should be understood that these openings 24, 26, 28, 30, and 32 (described in more detail below) may be incorporated into any suitable mower blade, and the mower blade configuration illustrated herein is only exemplary.

The circular, central hole 24 has a relatively large diameter and is centered on the blade longitudinal axis 18. The central hole 24 has a substantially circular circumference forming an opening extending completely through the mid-section 12. Each of the first and second slots 26, 28 are positioned on opposite sides of the central hole 24. The first and second slots 26, 28 are also centered on the blade longitudinal axis 18. Each of the first and second slots 26, 28 extend along the blade longitudinal axis 18 and have a width that is transverse to the blade longitudinal axis 18 and that is established at a maximum extent of the width by a pair of opposite, substantially parallel sides 34, 36 that are substantially parallel to the blade longitudinal axis 18. Also, the diameter of the central hole 24 is larger than the width of each of the first and second slots 26, 28.

The first and second circular, side holes 30, 32 are positioned off the blade longitudinal axis 18 and on opposite sides of the central hole 24. Each of the first and second side holes 30, 32 and the central hole 24 are centered on a common axis 38 that is transverse to the blade longitudinal axis 18. Each of the first and second side holes 30, 32 have a diameter that is smaller than the diameter of the central hole 24.

FIGS. 4–10 illustrate a plurality of washers 40a–40g that are preferably provided as a kit along with the mower blade 10. However, the washers 40a–40g may be provided separately or in any other suitable combination. The washers 40a–40g are used for installing the mower blade 10 on the blade adaptor of a lawnmower. The washers 40a–40g have different configurations with respect to one another to enable the mower blade 10 to be installed on differently configured blade adaptors with differently configured blade mounting devices.

Figure 4:
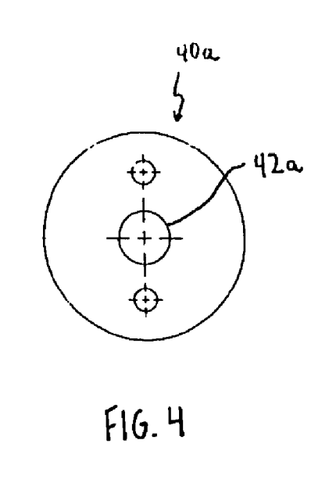
FIG. 4 is a top view of an embodiment of a washer for use in installing the mower blade shown in FIG. 1 on a blade adaptor of a lawnmower.
Figure 5:
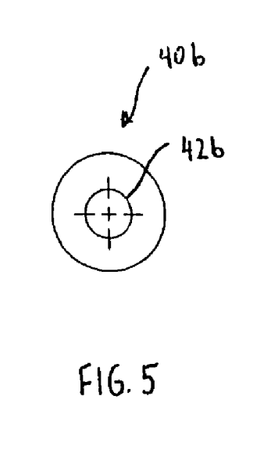
FIG. 5 is a top view of another embodiment of a washer for use in installing the mower blade shown in FIG. 1 on a blade adaptor of a lawnmower.
Figure 6:
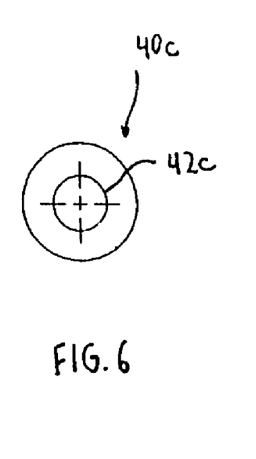
FIG. 6 is a top view of another embodiment of a washer for use in installing the mower blade shown in FIG. 1 on a blade adaptor of a lawnmower.
Figure 7:
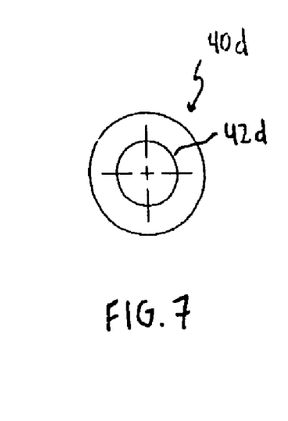
FIG. 7 is a top view of another embodiment of a washer for use in installing the mower blade shown in FIG. 1 on a blade adaptor of a lawnmower.
Figure 8:
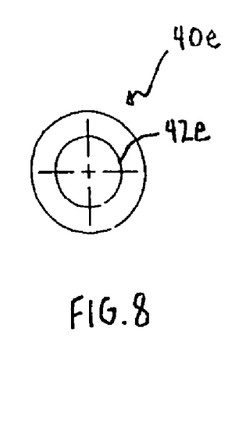
FIG. 8 is a top view of another embodiment of a washer for use in installing the mower blade shown in FIG. 1 on a blade adaptor of a lawnmower.
Figure 9:
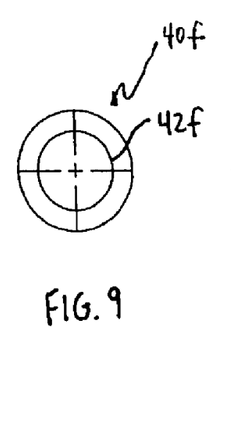
FIG. 9 is a top view of another embodiment of a washer for use in installing the mower blade shown in FIG. 1 on a blade adaptor of a lawnmower.
Figure 10:
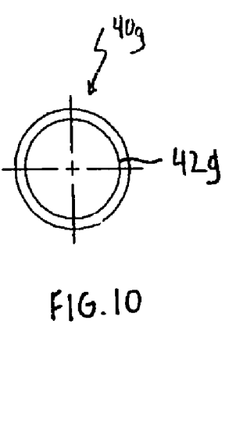
FIG. 10 is a top view of another embodiment of a washer for use in installing the mower blade shown in FIG. 1 on a blade adaptor of a lawnmower.

For example, the washer 40a in FIG. 4 may be positioned over the central hole 24 of the mower blade 10 such that side surfaces of the washer 40a would engage side surfaces of the mid-section 12 of the mower blade 10. The washer 40a has a central opening 42a that is suitably sized to correspond with the size of a fastener of the blade mounting device. When installed, the fastener of the blade mounting device would extend through the central opening 42a in the washer 40a, through the central hole 24 in the mower blade 10, through the blade adaptor, and into threaded engagement with the drive shaft of the lawnmower.

FIGS. 5–10 illustrate washers 40b–40g that may be positioned within the central hole 24 of the mower blade 10 such that outwardly facing peripheral surfaces of the washer

40*b*–40*g* would engage inwardly facing peripheral surfaces of the central hole 24 of the mower blade 10. Each of the washers 40*b*–40*g* has a respective central opening 42*b*–42*g* that corresponds to different sized fasteners of blade mounting devices. When installed, the fastener of the blade mounting device would extend through the central opening 42*b*–42*g* in the respective washer 40*b*–40*g*, through the blade adaptor, and into threaded engagement with the drive shaft of the lawnmower.

As mentioned above, lawnmowers include blade adaptors on the drive shaft thereof. The blade adaptors typically include one or more protrusions. The mower blade 10 is engaged with the blade adaptor such that the one or more protrusions of the blade adaptor extend through corresponding openings, i.e., holes 24, 30, 32 and slots 26, 28, provided in the mower blade 10. The plurality of openings in the mower blade 10 are suitably sized and positioned so that they can receive various sized and positioned protrusions provided on differently configured blade adaptors. Once the mower blade 10 is engaged with the blade adaptor, a blade mounting device secures the mower blade 10 to the blade adaptor.

Figure 11:
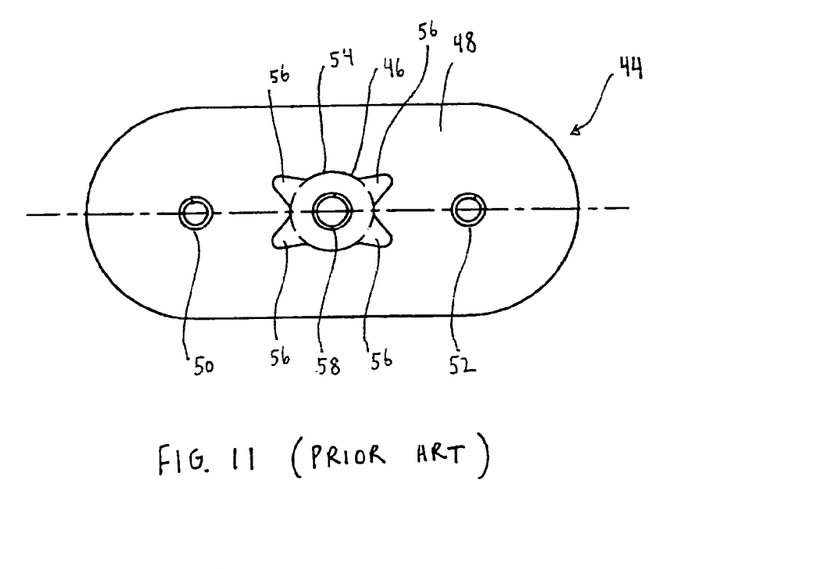
FIG. 11 is a bottom view of a prior art blade adaptor of a lawnmower.

FIG. 11 illustrates a prior art blade adaptor 44 of a lawnmower. Details of this prior art blade adaptor 44 can be found in U.S. Pat. No. 5,946,895 to Martens, which is incorporated herein in its entirety by reference thereto.

In general, the prior art blade adaptor 44 includes a central protrusion 46 protruding from a bottom side 48 of the blade adapter 44. The blade adaptor 44 also includes first and second extensions 50, 52 on opposite sides of the central protrusion 46 protruding from the bottom side 48 of the blade adaptor 44. The central protrusion 46 has a generally circular profile section 54 with a four teeth 56 protruding from an outer circumference of the central protrusion 46.

The blade adaptor 44 also includes a circular hole 58 extending therethrough. The shape and size of the circular hole 58 corresponds to the shape and size of a fastener of a blade mounting device. The circular hole 58 is for alignment with a threaded opening 60 provided in the drive shaft 62 of the lawnmower (see FIG. 13).

The mower blade 10 is structured such that the central protrusion 46 with the plurality of teeth 56 of the prior art blade adaptor 44 has an outermost diameter that is smaller than the diameter of the central hole 24. This configuration allows the central protrusion 46 including the teeth 56 of the blade adaptor 44 to be positioned completely within the central hole 24 of the mower blade 10 when the mower blade 10 is installed on the blade adaptor 44.

Figure 12:
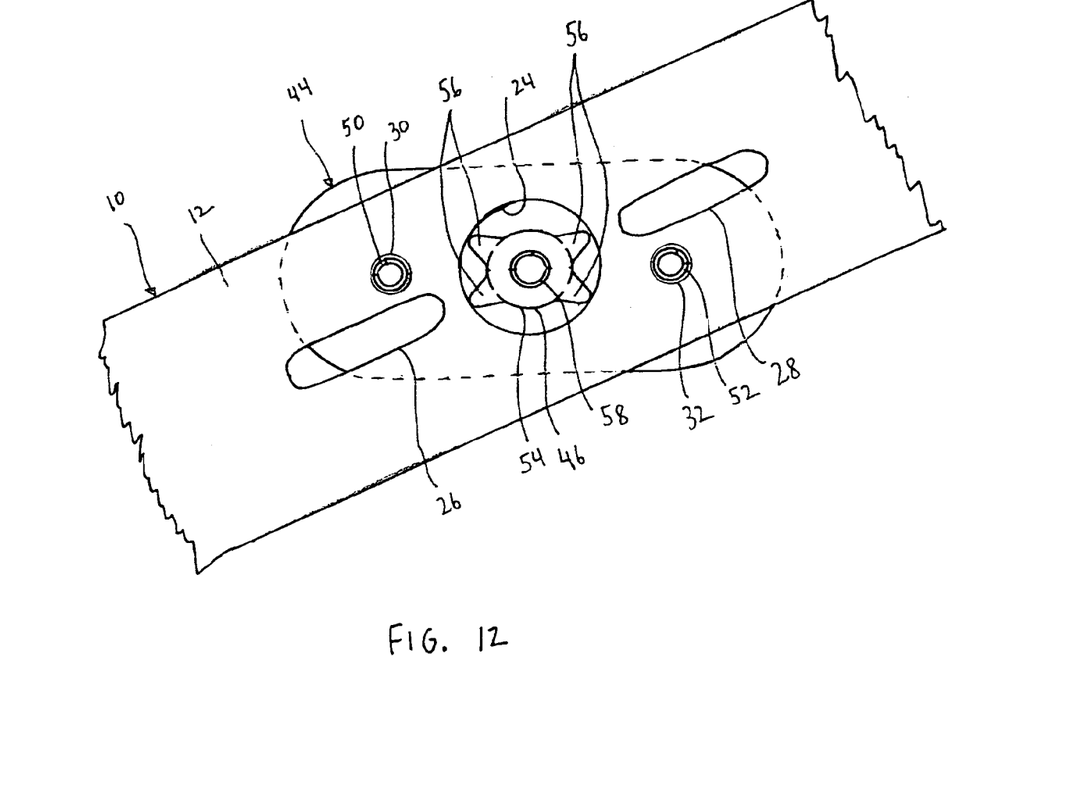
FIG. 12 is a bottom view illustrating the mower blade shown in FIG. 1 installed on the prior art blade adaptor shown in FIG. 11.

Installation of the mower blade 10 on the prior art blade adaptor 44 will now be described in greater detail. As shown in FIG. 12, the mower blade 10 is initially engaged with the blade adaptor 44 such that the central protrusion 46 of the blade adaptor 44, including the generally circular profile section 54 with four protruding teeth 56, extend completely into the circular, central hole 24 of the mower blade 10. Additionally, the first and second extensions 50, 52 on opposite sides of the central protrusion 46 are positioned completely within the first and second circular, side holes 30, 32 of the mower blade 10.

Figure 13:
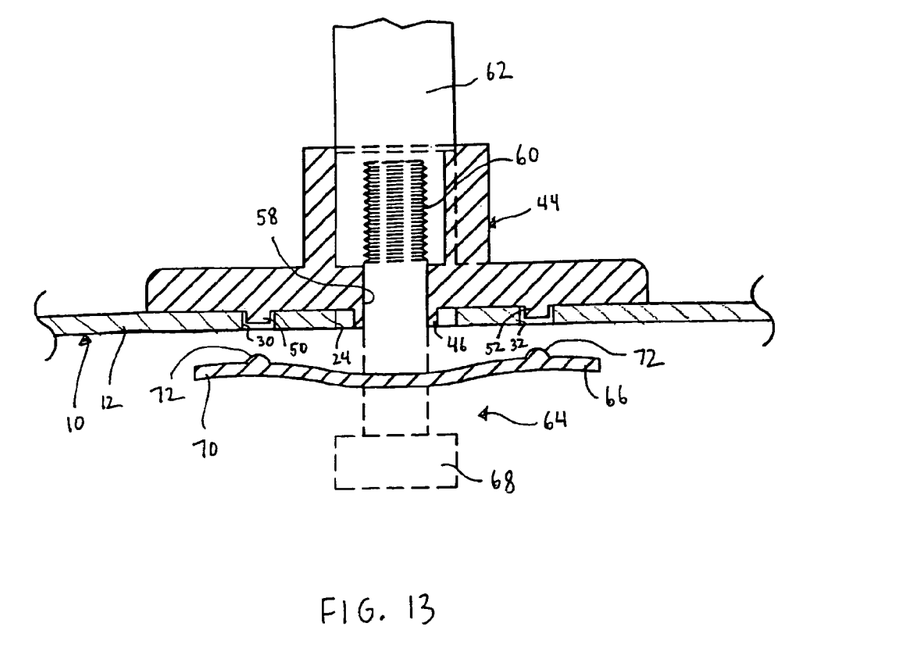
FIG. 13 is a cross-sectional view illustrating the mower blade shown in FIG. 1 installed on the prior art blade adaptor shown in FIG. 11 with a blade mounting device for securing the mower blade to the prior art blade adaptor.

The prior art blade adaptor 44 includes a corresponding blade mounting device 64 for securing a mower blade to the blade adaptor 44. As shown in FIG. 13, the blade mounting device 64 includes a blade support 66 and a fastener 68. The blade support 66 has a curved body 70 with a central hole and rounded protrusions 72 on opposite sides of the central hole. The fastener 68 includes a head and a threaded shaft. However, other suitable structures for securing a mower blade to the blade adaptor 44 may be employed.

To secure the mower blade 10 to the blade adaptor 44, the blade support 66 is engaged with the mower blade 10 such that central hole of the blade support 66 is aligned with the central hole 24 of the mower blade 10 and the circular hole 58 of the blade adaptor 44. Moreover, the rounded protrusions 72 of the blade support 66 extend partially through respective first and second circular, side holes 30, 32 of the mower blade 10 such that they face the first and second extensions 50, 52 of the blade adaptor 44. The fastener 68 is inserted through the central hole of the blade support 66, through the central hole 24 of the mower blade 10 and the circular hole 58 of the blade adaptor 44, and into threaded engagement with the threaded opening 60 provided in the drive shaft 62 of the lawnmower.

Figure 14:
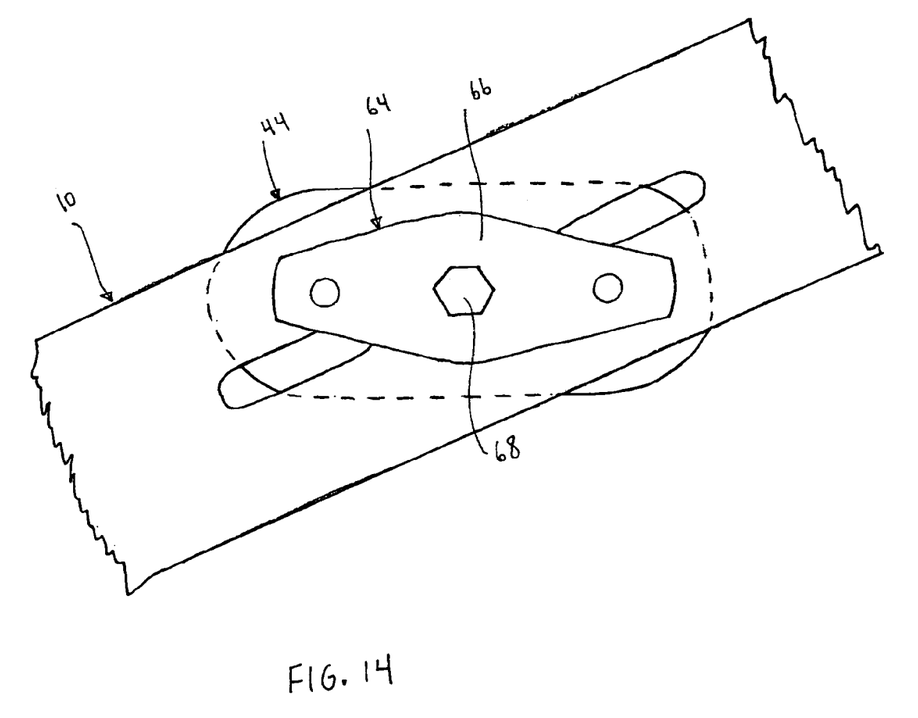
FIG. 14 is a bottom view illustrating the mower blade shown in FIG. 1 installed on the prior art blade adaptor shown in FIG. 11 with a blade mounting device for securing the mower blade to the prior art blade adaptor.

FIG. 14 illustrates the mower blade 10 secured to the prior art blade adaptor 44 with the fastener 68 being tightened into the drive shaft 62. As illustrated, the mower blade 10 is secured between the blade adaptor 44 and the blade mounting device 64.

Figure 15:
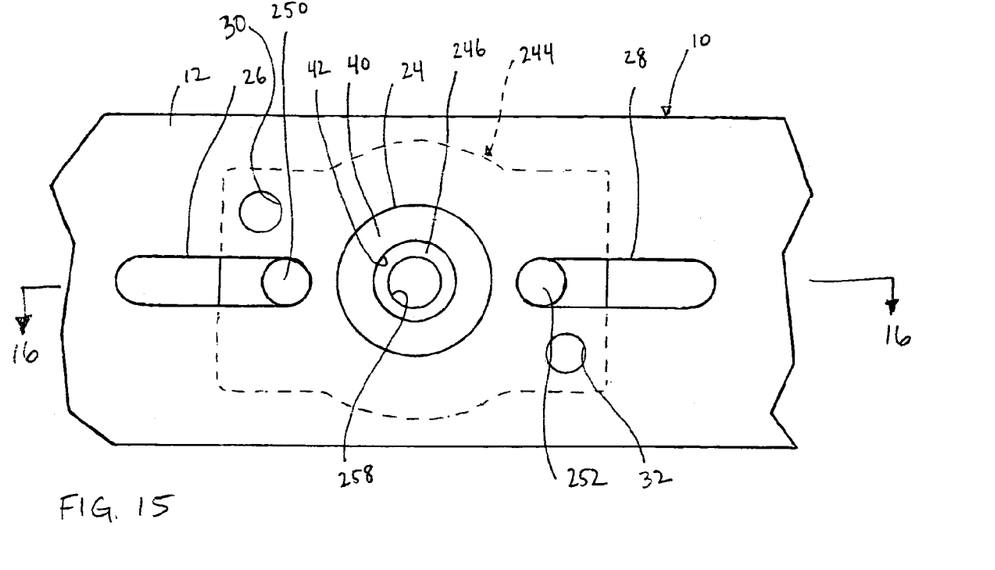
FIG. 15 is a bottom view illustrating the mower blade shown in FIG. 1 installed on another embodiment of a prior art blade adaptor.
Figure 16:
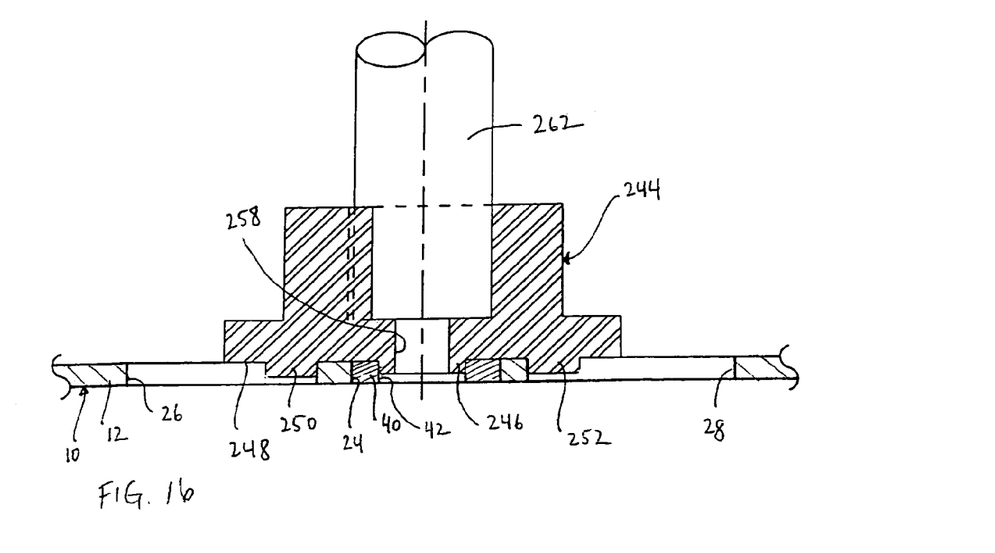
FIG. 16 is a cross-sectional view illustrating taken along line 16—16 in FIG. 15.

FIGS. 15 and 16 illustrate another embodiment of a prior art blade adaptor 244. As illustrated, the blade adapter 244 includes a central protrusion 246 protruding from a bottom side 248 of the blade adapter 244. The blade adapter 244 also has first and second side pins 250, 252 on opposite sides of the central protrusion 246 protruding from the bottom side 248 of the blade adaptor 244. In the illustrated embodiment, the central protrusion 246 has a generally circular profile. However, the central protrusion 246 may have any suitable profile, e.g., non-circular.

The blade adaptor 244 also includes a circular hole 258 extending therethrough. The shape and size of the circular hole 258 corresponds to the shape and size of a fastener of a blade mounting device. The circular hole 258 is aligned with a threaded opening provided in the drive shaft 262 of the lawnmower.

The mower blade 10 is structured such that the central protrusion 246 of the prior art blade adaptor 244 has an outermost diameter that is smaller than the diameter of the central hole 24. This configuration allows the central protrusion 246 of the blade adaptor 244 to be positioned completely within the central hole 24 of the mower blade 10 when the mower blade 10 is installed on the blade adaptor 244.

Installation of the mower blade 10 on the prior art blade adaptor 244 will now be described in greater detail. As shown in FIGS. 15 and 16, the mower blade 10 is initially engaged with the blade adaptor 244 such that the central protrusion 246 of the blade adaptor 244 extends completely through the circular, central hole 24 of the mower blade 10. Additionally, the first and second side pins 250, 252 on opposite sides of the central protrusion 246 are completely within respective first and second slots 26, 28 of the mower blade 10.

A blade mounting device (not shown), including at least a fastener, secures the mower blade 10 to the blade adaptor 244 preferably by being fastened through mower blade 10 and into drive shaft 262. In the illustrated embodiment, the diameter of the central hole 24 of the mower blade 10 is substantially larger than an outermost diameter of the central protrusion 246 of the blade adaptor 244. As a result, a washer 40, which may be one of the washers 40*b*–40*g* shown in FIGS. 5–10, may be positioned with the central hole 24 of the mower blade 10 such that the diameter of the central opening 42*b*–42*g* in the washer 40*b*–40*g* corresponds to the outermost diameter of the central protrusion 246. The fastener of the blade mounting device would be inserted through the central opening 42b–42g of the washer 40b–40g, through the circular hole 258 of the blade adaptor 244, and into threaded engagement with the threaded opening provided in the drive shaft 262 of the lawnmower.

It should be understood that the size and configuration of the blade adaptors 44, 244 illustrated is only exemplary. That is, the mower blade 10 is structured to be used with blade adaptors having protrusions of various sizes, configurations, and numbers.

Moreover, it should be understood that the size of the plurality of openings in the mower blade 10 is only exemplary and that the plurality of openings may have any suitable size. That is, the central hole 24 and the first and second side holes 30, 32 may have any suitable size diameter. Likewise, the first and second slots 26, 28 may have any suitable size width and length. Preferably, the sizes of the plurality of openings are selected to accommodate the widest range of differently configured blade adaptors.

It can thus be appreciated that embodiments of the present invention have now been fully and effectively accomplished. The foregoing embodiments have been provided to illustrate the structural and functional principles of the present invention, and are not intended to be limiting. To the contrary, the present invention is intended to encompass all modifications, alterations and substitutions within the spirit and scope of the appended claims.

What is claimed is:

1. A mower blade, comprising:
    a mid-section;
    two sharpened end sections on opposite sides of said mid-section to define an elongated portion; and
    a blade longitudinal axis extending through said mid-section and said end sections, said mid-section including a circular central hole having a diameter and being centered on said blade longitudinal axis, and first and second slots centered on said blade longitudinal axis, each of said first and second slots being positioned on opposite sides of said central hole, each of said first and second slots extending parallel said blade longitudinal axis and having a width that is transverse to, and crosses said blade longitudinal axis,
    said mid-section also including first and second circular side holes spaced apart from the circular central hole, the first and second circular side holes positioned off said blade longitudinal axis and on opposite sides of said central hole, each of said first and second side holes and said central hole being centered on a common axis that is oblique to said blade longitudinal axis.

2. A mower blade according to claim 1, wherein said end sections include respective outer segments and inner segments, said outer segments of said end sections are twisted in opposite directions with respect to one another about said blade longitudinal axis, and said inner segments of said end sections are twisted in opposite directions with respect to one another about said blade longitudinal axis.

3. A mower blade according to claim 1, wherein each of said first and second side holes have a diameter that is smaller than said diameter of said central hole.

4. A mower blade according to claim 1, wherein said diameter of said central hole is larger than said width of each of said first and second slots.

5. A mower blade assembly, comprising:
    a mower blade positioned on an adapter, said mower blade having a mid-section, two sharpened end sections on opposite sides of said mid-section, and a blade longitudinal axis extending through said mid-section and said end sections,
    said mid-section including a circular central hole having a diameter and being centered on said blade longitudinal axis, and first and second slots centered on said blade longitudinal axis, each of said first and second slots being positioned on opposite sides of said central hole,
    said mid-section also including first and second circular side holes spaced apart from the circular central hole, the first and second circular side holes positioned off said blade longitudinal axis and on opposite sides of said central hole, each of said first and second side holes and said central hole being centered on a common axis that is oblique to said blade longitudinal axis, and
    said adapter attached to a lawnmower, said adapter having a central protrusion protruding from a bottom side of said adapter, said central protrusion having a plurality of teeth projecting from an outer circumference of said central protrusion and having an outermost diameter that is smaller than said diameter of said central hole, and said central protrusion being positioned completely within said central hole.

6. A mower blade assembly according to claim 5, wherein said end sections include respective outer segments and inner segments, said outer segments of said end sections are twisted in opposite directions with respect to one another about said blade longitudinal axis, and said inner segments of said end sections are twisted in opposite directions with respect to one another about said blade longitudinal axis.

7. A mower blade assembly according to claim 5, wherein said adapter also includes first and second extensions on opposite sides of said central protrusion and projecting from said bottom side of said adapter, and said first and second extensions being positioned completely within respective first and second circular, side holes in said mower blade.

8. A mower blade assembly according to claim 5, wherein said central protrusion has four teeth.

9. A mower blade assembly according to claim 5, further comprising: a blade mounting device that secures said mower blade on said adapter.

10. A mower blade assembly according to claim 9, wherein said blade mounting device includes a blade support and a fastener.

11. A mower blade assembly according to claim 10, wherein said blade support has a pair of extensions that are positioned within said first and second circular side holes.

12. A mower blade assembly according to claim 9, further comprising:
    a washer positioned between said blade mounting device and said mower blade.

13. A mower blade assembly, comprising:
    a mower blade positioned on an adapter, said mower blade having a mid-section, two sharpened end sections on opposite sides of said mid-section, and a blade longitudinal axis extending through said mid-section and said end sections,
    said mid-section including a circular central hole having a diameter and being centered on said blade longitudinal axis, and first and second slots centered on said blade longitudinal axis, each of said first and second slots being positioned on opposite sides of said central hole, each of said first and second slots extending along said blade longitudinal axis and having a width that is transverse to said blade longitudinal axis and that is established at a maximum extent of said width by a pair of opposite, substantially parallel sides that are substantially parallel to said blade longitudinal axis, said mid-section also including first and second circular side holes spaced apart from the circular central hole, the first and second circular side holes positioned off said blade longitudinal axis and on opposite sides of said central hole, each of said first and second side holes and said central hole being centered on a common axis that is oblique to said blade longitudinal axis, and said adapter attached to a lawnmower, said adapter having a central protrusion protruding from a bottom side of said adapter, said central protrusion having an outermost diameter that is smaller than said diameter of said central hole, and said central protrusion being positioned completely within said central hole.

14. A mower blade assembly according to claim 13, wherein said adapter also has first and second side pins on opposite sides of said central protrusion protruding from said bottom side of said adapter, and said first and second side pins being positioned completely within respective first and second slots of said mower blade.

15. A mower blade assembly according to claim 13, wherein said end sections include respective outer segments and inner segments, said outer segments of said end sections are twisted in opposite directions with respect to one another about said blade longitudinal axis, and said inner segments of said end sections are twisted in opposite directions with respect to one another about said blade longitudinal axis.

16. A mower blade assembly according to claim 13, wherein said adapter also includes first and second extensions on opposite sides of said central protrusion projecting from said bottom side of said adapter, and said first and second extensions being positioned completely within respective first and second circular side holes in said mower blade.

17. A mower blade assembly according to claim 13, further comprising:

a blade mounting device that secures said mower blade on said adapter.

18. A mower blade assembly according to claim 17, wherein said blade mounting device includes a blade support and a fastener.

19. A mower blade assembly according to claim 18, wherein said blade support has a pair of protrusions that are positioned within said first and second circular side holes.

20. A mower blade assembly according to claim 17, further comprising:

a washer positioned between said blade mounting device and said mower blade.

* * * * *